United States Patent [19]

Foulks, Jr. et al.

[11] 3,988,330
[45] Oct. 26, 1976

[54] HIGH MOLECULAR WEIGHT ESTERS OF $C_{22+}\alpha$-OLEFIN DERIVED ACIDS

[75] Inventors: Harold C. Foulks, Jr., Newport, Ky.; Herbert G. Rodenberg; Harold E. Mains, both of Cincinnati, Ohio

[73] Assignee: Emery Industries, Inc., Cincinnati, Ohio

[22] Filed: Oct. 23, 1974

[21] Appl. No.: 517,332

[52] U.S. Cl................. 260/410.6; 260/410.7; 260/410.9 R; 252/56 S
[51] Int. Cl.².............. C08H 3/00; C09F 5/08; C11C 3/02
[58] Field of Search.............. 260/410.6, 410.9 R, 260/410.7; 252/56 S

[56] References Cited
UNITED STATES PATENTS

| | | | |
|---|---|---|---|
| 2,586,780 | 2/1952 | Brewer | 260/410.6 X |
| 2,614,983 | 10/1952 | Caldwell | 260/410.6 X |
| 2,823,216 | 2/1958 | Moote | 260/413 |
| 2,939,874 | 6/1960 | Kirkland | 260/410.6 |
| 3,252,909 | 5/1966 | Jenks | 252/56 S |
| 3,542,678 | 11/1970 | Bork | 260/410.6 X |
| 3,691,219 | 9/1972 | Boussely | 260/410.7 |

FOREIGN PATENTS OR APPLICATIONS

| | | | |
|---|---|---|---|
| 1,025,028 | 4/1966 | United Kingdom | 260/410.6 |
| 1,154,228 | 6/1969 | United Kingdom | 260/410.6 |

*Primary Examiner*—Winston A. Douglas
*Assistant Examiner*—John F. Niebling
*Attorney, Agent, or Firm*—Gerald A. Baracka; John D. Rice

[57] ABSTRACT

Ester products useful as lubricants for structural resins are obtained by the reaction of mono- and polyfunctional alcohols with high molecular weight branched- and straight-chain aliphatic monocarboxylic acids obtained from $\alpha$-olefins containing 22 or more carbon atoms. High molecular weight acids useful for the preparation of the present esters are obtained by the free radical addition of a short-chain monocarboxylic acid to the $C_{22+}$ olefin or by ozonization of the $C_{22+}$ olefin. The esters of this invention provide excellent internal-external lubrication for PVC homopolymers and copolymers.

6 Claims, No Drawings

HIGH MOLECULAR WEIGHT ESTERS OF $C_{22+}\alpha$ OLEFIN DERIVED ACIDS

BACKGROUND OF THE INVENTION

To facilitate processing of most resin compositions (e.g. acrylonitrile-butadiene-styrene resins, polystyrene resins, polyamide resins and rigid or plasticized polyvinylchloride (PVC) resins) lubricants are required if useful and uniform finished products are to be obtained. Lubricants play a particularly important role in the extrusion, injection molding and blow molding of rigid PVC resin compositions.

Both internal and external lubrication is essential to maintain acceptable rheological properties of the melt throughout the processing and to obtain a useful finished product. Internal lubrication operates within the melt to reduce the melt viscosity of the polymer at the processing temperatures and improve the flow characteristics of the materials so that a high output of resin is possible using a minimum amount of work and without destroying the physical properties of the resin. External lubrication is required to reduce friction and sticking at the interface between the plastic melt and the metal surfaces of processing equipment in order to obtain a consistently uniform product having a smooth finish and essentially free of surface defects.

Emphasis has recently been shifted to developing new and better lubricant compounds which meet all the lubrication requirements for the processing of PVC and other resins, that is, function both as an internal and external lubricant. U.S. Pat. No. 3,578,621, for example, discloses diesters of the formula

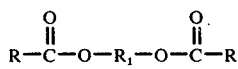

wherein R is an alkyl radical having 15 to 30 straight chain carbon atoms and $R_1$ is an alkylene or alkenylene radical having 2 to 12 straight chain carbon atoms and indicates that these compounds exhibit combined internal and external lubricating properties. Diesters of the above types are prepared by reacting monocarboxylic acids having 16 to 30 carbon atoms arranged in a straight chain with dihydric alcohols having 2 to 12 carbon atoms. The diesters of the U.S. Pat. No. 3,578,621 are limited to those derived from pure monocarboxylic acids. Diesters obtained from mixed acids (montan wax esters are specifically mentioned) are indicated to be ineffective internal-external lubricants in the U.S. Pat. No. 3,578,621. Mixed acids (montanic acids) having a broad molecular weight distribution are obtained from montan wax and esters thereof are reported in the literature and commercially available. The montanic acids are mixed monocarboxylic acids typically containing from about 22 to 36 carbon atoms, with the predominant acids falling in the $C_{26}$–$C_{32}$ carbon atom range. The bulk of the monocarboxylic acids derived from montan wax are straight chain and contain an even number of carbon atoms. These acids are obtained from montan wax by saponification and separation of the resulting soaps from the unsaponifiable materials. They are also obtainable by the chromic acid oxidation of montan wax.

SUMMARY OF THE INVENTION

We have now discovered novel ester products obtained from high molecular weight synthetic acids derived from $\alpha$-olefins containing 22 or more carbon atoms. Quite unexpectedly we have also found that the esters prepared from these high molecular weight synthetic branched- and straight-chain aliphatic acids exhibit superior internal-external lubrication properties when incorporated into a variety of thermoplastic resins at 0.1 to 5 phr. These esters are particularly useful as lubricants for PVC homopolymer and copolymers.

The esters of this invention are derived from aliphatic hydroxylic compounds containing 2 to 25 carbon atoms and, more preferably, 2 to 12 carbon atoms and 1 to 10 and, more preferably, 2 to 8 primary or secondary hydroxyl groups and high molecular weight acids obtained by the ozonization of $C_{22+}$ $\alpha$-olefins or by the free radical addition of short-chain monocarboxylic acids containing 3 to 12 carbon atoms to $C_{22+}$ $\alpha$-olefins. The mixed acids useful for the preparation of the present esters which are obtained from the ozonization process contain at least 55% by weight $C_{21-35}$ acids and fewer than 30% by weight acids having less than 21 carbon atoms. These mixed acids are further characterized by having a ratio of odd to even carbn content acids in the $C_{21-35}$ range between about 1.5:1 and 10:1 and, more preferably, from 1.75:1 to 4:1. Especially useful esters are obtained with mixed acids containing more than 70 wt. % $C_{21-35}$ acids and less than 20 wt. % acids having fewer than 21 carbon atoms. Especially useful acids from the free radical addition process are obtained when the short chain monocarboxylic acid is propionic acid. Excellent lubricant esters are obtained when the aliphatic hydroxylic compound is ethylene glycol, neopentyl glycol, mono-, di- or tripentaerythritol, or mono-, di-, tri- or tetraglycerol. The preferred lubricant esters typically have acid values less than 30, hydroxyl values less than 40 and melt in the range 50°–120° C.

DETAILED DESCRIPTION

The present invention relates to useful ester compositions derived from hydroxylic compounds, including mono- and polyfunctional alcohols, and high molecular weight aliphatic monocarboxylic acids, which can be either straight- or branched-chain. The high molecular weight monocarboxylic acids employed are obtained from alpha-olefins containing 22 or more carbon atoms or mixtures of said alpha-olefins (hereinafter referred to as $C_{22+}$ $\alpha$-olefins). Small amounts of olefins containing less than 22 carbon atoms may be present in the olefin mixtures, however, for best results the amount should not exceed 10% by weight of the total olefins, and more typically will be less than 5 wt. %. There may also be present some internal (non-vinyl) olefins, however, olefins of the type $>C=CH_2$ should comprise at least 55% and, more preferably, will be greater than 70 wt. % of the olefin feed.

Alpha-olefins satisfying the above requirements useful for the preparation of the high molecular weight monocarboxylic acids are obtainable by the polymerization of ethylene. Reactions, referred to as chain growth reactions, where ethylene is added to an aluminum alkyl and inserted between the aluminum and one of the alkyl groups are practiced commercially and described in the literature. Alpha-olefins of predetermined average size are obtained by terminating the growth reaction when the required amount of ethylene has been added and then displacing the long alkyl group. The length of the alkyl group will be dependent on the reaction conditions employed and the ethylene charge. Numerous variations of these processes are possible to shift the α-olefin distribution and are within the skill of the art. Where olefins having a narrow molecular weight distribution are desired it may be necessary to fractionally distill, solvent extract or otherwise treat the resulting olefin products prior to conversion of the high molecular weight acids. To obtain the acids from which the esters of this invention are derived the olefin will preferably contain 90% by weight or more olefins having 22 or more carbon atoms ($C_{22+}$ olefins). Excellent results are obtained from ester products derived from olefins containing 70% by weight or more olefins having 30 or more carbon atoms ($C_{30+}$ olefins).

Employing the above-described alpha-olefins, the high molecular weight monocarboxylic acids used in the preparation of the esters of this invention are obtained either (a) by the high-temperature ozonization of the olefin or (b) by the free-radical addition of a short-chain monocarboxylic acid to the olefin. Both these reactions are described in the literature.

The ozonization of high molecular weight alpha-olefins at elevated temperatures is described in the application Ser. No. 361,205 filed May 17, 1973, now abandoned and is incorporated herein by reference. In this process high molecular weight olefins or olefin mixtures are contacted with ozone in a suitable participating reaction medium, preferably at a temperature above the titering point of the olefin/solvent reaction mixture, and then oxidatively cleaved to obtain high molecular weight monocarboxylic acids. In general the reaction procedure involves distinct steps of ozonization followed by scission and oxidation of the formed ozonides.

The first step of the process comprises reacting the olefin or olefin mixture with ozone. It is preferable in carrying out the ozonization to mix the ozone with a carrier gas. Excellent results are obtained when the carrier gas is oxygen or a mixture of oxygen with air or carbon dioxide and when the gas mixture contains from about 0.1 to about 15% by weight ozone and more preferably from about 1 to 5% ozone. The olefin is contacted with the ozone in a suitable reactor or absorber to obtain the olefin ozonide. Olefin and solvent may be fed to the reactor separately or may be combined in a mixing tank and this mixture charged.

A stoichiometric amount of ozone is generally employed if efficient contact of olefin and ozone is maintained, however, in certain systems, particularly batch processes, it may be desirable to add a slight excess of ozone to insure that all of the olefin has been converted to ozonide. Participating solvents, which are essential to the safe and efficient conduct of the process, are monocarboxylic acids containing from about 4 to about 13 carbon atoms. Pelargonic acid and mixtures of acids containing 50% or more pelargonic acid are especially useful participating solvents. In conducting the process the weight ratio of the olefin to participating solvent may range from about 2:1 to about 1:10 with best results being obtained at weight ratios between about 1:1 and 1:3. The olefin and participating solvent may be combined prior to contacting with the ozone or at least part of the solvent may be added continuously or incrementally at any stage prior to the oxidation and scission step. The temperatures at which the ozonization is conducted is also important and should be maintained above about 50° C and preferably above the titering point of the reaction mixture. Temperatures in the ozonization step will therefore usually range between about 60° C and about 85° C, however, they may go as high as 100° C.

The olefin ozonide formed during the ozonization step is next reacted with oxygen under conditions which promote scission and oxidation of the ozonide to the acid products. The scission and oxidation steps may be conducted simultaneously or as separate and distinct operations. This is achieved in conventional equipment employing either batch or continuous procedures, the only requirement being that the olefin ozonide be intimately mixed with oxygen and some means provided for temperature control. The usual temperatures employed in the scission and oxidation steps of the process range between about 75° and 145° C. If distinct steps are employed for the scission and oxidation the same temperatures may be employed, however, it is more customary to conduct the oxidation at slightly higher temperatures than the scission. Temperatures between about 85° and 105° C are normally employed to cleave the olefin ozonides whereas it is preferred that the oxidation be conducted at temperatures between about 100° and 125° C. Uniform and controllable scission and oxidation are obtained when these temperature limits are observed.

An amount of gaseous oxygen sufficient to completely oxidize the ozonide is required. While pure oxygen may be advantageously employed other oxygen-containing gases such as mixtures of oxygen with argon, helium, neon or nitrogen may also be used for this purpose, however, the gas mixtures should contain at least 20% by weight oxygen. An amount of oxygen ranging from about 1 to about 4 moles of oxygen per mole of olefin is used but larger amounts may be employed, as desired, to speed the process, insure complete oxidation and improve yields. The efficiency of contacting the materials is important since the time required for splitting and oxidizing the ozonides is highly dependent thereon. In most instances this phase of the reaction is substantially complete in from about ½ to about 20 hours.

Catalysts are not necessary to bring about the scission and oxidation of the ozonide, however, they are usually desirable to accelerate these reactions. Synergistic combinations of catalytic agents may be used. Useful materials which may be added to the ozonide mixture prior to subjecting it to oxidation and which serve as catalytic agents include the alkali and alkaline earth metal hydroxides and various metal compounds including salts of Group VIII metals, preferably, iron, cobalt and nickel, and other compounds of these and other metals such as manganese. The chlorides, sulfates and carboxylates of these metals are useful as are the oxides and hydroxides. The metal compounds may be used individually or combinations of two or more metal compounds may be useful. The amount of the total catalyst will range from about 0.01 to about 2% by weight of the total reaction mixture.

Employing olefin feeds as described above in the ozonization process the resulting straight-chain mixed acids will generally contain less than 30 weight percent acids having fewer than 21 carbon atoms. The bulk of the mixed acids contain 21 or more carbon atoms with $C_{21-35}$ acids constituting 55% by weight or more of the mixed monocarboxylic acid product with less than 20% by weight acids having greater than about 35 carbon atoms. Most often, particularly when $C_{30+}$ olefins are employed, the acid compositions will contain less than about 20 weight percent acids having fewer than 21 carbon atoms, greater than 70 weight percent $C_{21-35}$ acids and less than about 10% acids containing more than 35 carbon atoms. The ratio of odd carbon content acids to even carbon content acids in the $C_{21-35}$ range is between 1.5:1 and 10:1. This ratio is more generally from about 1.75:1 to about 4:1. The distribution of monocarboxylic acids and the ratio of the odd to even carbon content acids distinguishes the present products obtained from α-olefins from those derived from montan wax acids.

In addition to the high molecular weight acids obtained from the above-described ozonization process of $C_{22+}$ olefins, which are predominantly straight-chain acids, branched-chain high molecular weight acids obtained by the free radical addition of short-chain monocarboxylic acids to the $C_{22+}$ olefin are also useful for the production of the novel and useful esters of this invention. Acids obtained by such free radical addition reactions are predominantly α-alkyl monocarboxylic acids containing at least 25 carbon atoms. Processes for preparing such high molecular weight branched-chain acids are described in the prior art in British Pat. Nos. 960,894, 1,098,464 and 1,098,465, U.S. Pat. No. 2,823,216 as well as in other references. The α-olefin is reacted with a short-chain monocarboxylic acid containing 3 to 12 carbon atoms such as propionic, butyric, valeric, 2-ethylhexoic, pelargonic or lauric acids using a suitable free radical generating means. Excellent results are obtained with the addition of propionic acid to the α-olefin using free radical initiators such as inorganic and organic peroxides, persulfates, perborates and perchlorates. In addition to the 1:1 addition product, i.e. the α-alkyl monocarboxylic acids, other adducts are possible from the free radical reaction depending on the reactant ratio and the reaction conditions. For example, 2:1 (olefin:acid) adducts, α,α'-dialkyl monocarboxylic acids, can be obtained. Similarly, some 1:2 adduct may also be formed during the reaction. It is also possible under the free radical conditions of this reaction to form dimers and possibly higher oligomers of the olefin which in turn can react with short-chain acid to yield products having approximately double the molecular weight. For example, a $C_{22}$ α-olefin could form a $C_{44}$ α-olefin which in turn could react with propionic acid to yield a $C_{47}$ α-methyl branched acid. While the 1:1 adducts are the predominant species under normal reaction conditions, substantial amounts of these other adducts can be formed and are not detrimental to the formation of the esters of this invention.

The esters of this invention are prepared employing either of the foregoing types of high molecular weight monocarboxylic acids derived from $C_{22+}$ olefins. Esters obtained with these acids are extremely useful lubricants for structural resins, particularly PVC homopolymer and copolymer resins. These esters have the ability to function as both internal and external lubricants and satisfy the total lubricant needs of the resin so that the incorporation of other lubricant additives is not required. The superior performance characteristics are most surprising when it is considered that similar esters obtained with naturally occurring mixed acids, such as esters of montanic acids, do not exhibit the same high degree of internal-external lubrication as the esters of this invention.

In addition to the unexpectedly superior internal-external lubrication, the fact that these products are readily obtainable from completely synthetic sources, thus insuring uniformity or, where desired, controlled variation of the composition, makes these esters commercially attractive. The present compositions also have other useful properties which contribute to their effectiveness and desirability as lubricants. For example, the present ester products are readily dispersible in and compatible with a wide variety of resins. These esters also have superior heat stabilities and are capable of withstanding rigorous processing for prolonged periods without significant decomposition, thus insuring minimal discoloration and loss of physical properties in the finished product. The esters have high melting points which is considered useful in maintaining a lubricating film. The high molecular weight of these compositions also makes them resistant to volatilization during the processing operations. In addition to all of the above-mentioned features these esters can be utilized at very low levels resulting in considerable economic advantage to the user. This feature also minimizes the plasticization effect of the lubricant additive on the resin.

The esters of this invention are obtained by the reaction of the alpha-olefin derived high molecular weight monocarboxylic acids and an aliphatic hydroxylic compound containing from 2 to about 25 carbon atoms and from 1 to about 10 primary or secondary hydroxyl groups. Useful aliphatic hydroxylic compounds include monohydric alcohols, di- and higher polyhydric alcohols and ether alcohols, which can be either mono- or polyfunctional. By way of illustration useful aliphatic monohydric alcohols include ethanol, n-propanol, sec-propanol, n-butanol, t-butanol, isoamyl alcohol, n-hexanol, 2-ethylhexanol, n-octanol, isodecanol, capryl alcohol, lauryl alcohol, myristyl alcohol, cetyl alcohol, stearyl alcohol and oxo alcohols such as tridecyl alcohol, which is mainly tetremethyl-1-nonanol, and hexadecyl alcohol which is a complex mixture of primary alcohols characterized as 2,2-dialkyl ethanols where the alkyl groups are predominantly methyl-branched $C_6$ and $C_8$ radicals. Useful aliphatic polyols for the preparation of the esters of this invention include ethylene glycol, 1,2-propylene glycol, 1,3-propylene glycol, 1,2-butanediol, 1,3-butanediol, 1,4-butanediol, 1,5-pentanediol, 3-methyl-1,5-pentanediol, 2,3-dimethyl-2,3-butanediol, trimethylol propane, mannitol, sorbitol, glycerol, pentaerythritol and the like. Ether alcohols (intermolecular ethers formed by the condensation of two or more molecules of a polyol accompanied by the elimination of water) are also useful for the preparation of the esters of this invention. The ether alcohols can be either mono- or polyfunctional and contain from 2 up to as many as 8 condensed polyol units. Illustrative ether alcohols which can be employed are diethylene glycol, triethylene glycol, tetraethylene glycol, diethylene glycol monomethylether, diethylene glycol monoethylether, triethylene glycol monomethyl ether, butoxyethanol, butylene glycol monobutylether, dipentaerythritol, tripentaerythritol, tetrapentaerythritol, diglycerol, triglycerol, tetraglycerol, pentaglycerol, hexaglycerol, heptaglycerol, octaglycerol and the like. When polyols and ether polyols are employed it is not necessary that all the available hydroxyl groups be reacted with the high molecular weight monocarboxylic acids. As will be recognized by those skilled in the art, partial ester are possible using polyols and are within the scope of this invention. It is advantageous, however, when employing a polyol or mixture of polyols to convert at least 50% of the available hydroxyl groups to esters.

Superior ester products useful as lubricants for resins are obtained with aliphatic polyols and ether polyols containing from about 2 to 12 carbon atoms and 2 to 8 primary or secondary hydroxyl groups. Exceptionally useful ester lubricants possessing excellent internal-external lubrication properties are obtained when the polyols are ethylene glycol, neopentyl glycol, pentaerythritol, dipentaerythritol, tripentaerythritol, glycerine, and di-, tri- and tetraglycerol. These preferred ester compositions will generally melt between about 50° and 120° C and have acid values less than 30 and hydroxyl values less than 40.

The reaction of the high molecular weight monocarboxylic acid and the aliphatic hydroxylic compound is carried out using conventional esterification procedures and equipment, that is, by heating the reaction mixture with or without a catalyst at a temperature from about 100° to 300° C while removing the water of reaction. The esterification reactions are more usually conducted within the temperature range 150° to 250° C. It is not essential but a catalyst can be used. Acid catalysts such as sulfuric acid, phosphoric acid, alkyl and aryl sulfonic acids such as p-toluene sulfonic acid and methane sulfonic acid, and a variety of metal compounds including dibutyl tinoxide, tetrabutyl titanate, zinc acetate, stannous oxalate, iron oxide, ferric stearate, manganous stearate, cobaltous stearate, and the like are illustrative of the numerous compounds capable of catalyzing the reaction. The amount of catalyst will usually range from 0.1 to 1.0% by weight of the total reactant charge. A diluent which is inert to the reaction conditions and which forms and azeotrope with water, such as benzene, toluene or xylene, can be employed in carrying out the reaction but is not necessary. Stiochiometric amounts of the acid and alcohol will usually be employed, however, with the lower boiling hydroxylic compounds an excess of an alcohol can be charged. The excess hydroxylic compound is distilled from the reaction mixture as the esterification reaction is carried to completion and may be recycled, if desired. Usually up to about 25 wt. % excess of the hydroxylic compound will suffice for this purpose, however, larger amounts can be used. While the esterification reaction may be conducted entirely at atmospheric pressure it is generally more desirable to reduce the pressure to about 2–50 mm Hg. during the final stages to remove the last traces of water and strip off excess glycol or other volatiles which may be present. The esters are generally used as they are obtained from such reactions and require no additional treatment, however, if improvement in the color of the ester is desired it can be bleached with ozone, peroxide, hypochlorite or other suitable bleaching agents or decolorized using bleaching clays, charcoal or the like.

Esters obtained in accordance with this invention exhibit superior internal and external lubrication when used with a variety of thermoplastic resins. While these esters are particularly useful with polyvinylchloride homopolymers and copolymers, they also find application with acrylonitrilebutadiene-styrene copolymers, polyacrylonitrile, polystyrene, polybutadiene, polyesters, polyolefins, polyvinylbutyral, cellulose acetate and the like. These esters also have application with post-chlorinated polyvinylchloride. Useful polyvinylchloride copolymers include those obtained when vinyl chloride is polymerized with vinyl acetate, vinyl bromide, vinyl propionate, vinyl butyrate, vinylidene chloride, methylmethacrylate, methylacrylate, 2-ethylhexylacrylate, acrylonitrile, methacrylonitrile, styrene and the like, or any combination of two or more of these comonomers. The present esters are especially useful with polyvinylchloride resins having vinyl chloride contents above about 50 percent by weight. The amount of ester employed will vary between about 0.1 part and about 5 parts per 100 parts by weight of the resin, however, the esters more usually range between about 0.2 and 2 phr.

The esters of this invention are readily compatible with the aforementioned resins within the limits required for efficient internal-external lubrication. They can be incorporated into PVC or other resins using conventional means such as blending on a mill or mixing in a Banbury mixer or other internal mixer or kneading apparatus. The ester can be dissolved or dispersed in a suitable solvent and added to the resin in this manner. The lubricants can be added separately or included in a masterbatch with other compounding ingredients. The present esters are readily compatible with the other compounding ingredients such as stabilizers (to protect the resins against the deleterious affects of oxygen, heat and light), pigments, dyes, fillers, plasticizers, processing aids, and the like, and can be used in conjunction therewith to provide formulated resins having a good balance of physical properties. The physical properties of the formulated resin can be varied widely by manipulation of the amount and type of compounding ingredients without appreciably detracting from the internal-external lubrication properties of the ester.

The following examples illustrate the present invention more fully, however, they are not intended as a limitation on the scope thereof. In these examples all parts and percentages are given on a weight basis unless otherwise indicated.

EXAMPLE I

To obtain the mixed acid products useful in the preparation of the esters of this invention equal parts of $C_{30+}$ α-olefin (Gulf $C_{30+}$ olefin fraction, m.p. 160°–167° F, containing 78 wt. % $C_{30}$ and higher olefins) and pelargonic acid were fed into the top section of a countercurrent absorber while a stream of oxygen and carbon dioxide containing approximately 1.5–2% ozone was fed into the bottom section. The rates of flow of the $O_3/O_2$ gas stream and the olefin feed were adjusted so that the $C_{30+}$ α-olefin absorbed as much ozone as possible in passing through the absorber and so that all but trace amounts of ozone were removed from the oxygen. The temperature in the absorber was maintained in the range 65°–85° C. The effluent gases were scrubbed with water to remove organic vapors and particulate matter and then passed through a catalytic furnace where organic matter was oxidized to carbon dioxide and water. The gas was then dried and recycled.

The ozonide was removed from the bottom of the absorber and passed into a decomposition vessel containing a heel of pelargonic acid, 0.25% sodium hydroxide based on weight of ozonide and previously decomposed ozonide to serve as a diluent. The decomposition vessel was maintained at a temperature of 95°

C while adding oxygen containing 1% ozone and the ozonide added over a 2 hour period. When the addition was complete the decomposition was continued for 2 additional hours before transferring to an oxidation reactor. The oxidation was carried out in the presence of manganese acetate tetrahydrate (0.1% based on the $C_{30+}$ olefin) in an oxygen atmosphere. The time required for oxidation was 4 hours.

The mixed oxidation product was then stirred with 0.5% phosphoric acid (75%) for 15 minutes and an activated bleaching clay (Filtrol Grade No. 1) added with additional stirring. The mass was filtered to remove the manganese salts of phosphoric acid and the filter aid and then stripped of pelargonic acid under reduced pressure using a Vigreaux column. The stripping was conducted at 230° C and during the final stages the pressure was reduced to 0.5 torr. A portion of the mixed acid product, crystallized from glacial acetic acid, was analyzed by gas-liquid chromatography of the methyl esters employing a modification of ASTM Test Method D 1983-64T. A Hewlett Packard Model 7550 chromatograph equipped with a 6 foot × ⅛ inch stainless steel column packed with 10% silicone rubber on 80–100 mesh Diatoport S was used. The instrument was programmed for an 8° C per minute temperature rise over the range 75°–333° C with a helium flow of 15 mls per minute and 50 psig. The mixed acid product (equivalent weight 586; 7–8 Gardner color) had the following compositional analysis:

| Acid | Wt. % |
|---|---|
| $C_{9-21}$ | 10.27 |
| $C_{22}$ | 3.85 |
| $C_{23}$ | 5.14 |
| $C_{24}$ | 3.26 |
| $C_{25}$ | 6.83 |
| $C_{26}$ | 3.08 |
| $C_{27}$ | 11.57 |
| $C_{28}$ | 2.83 |
| $C_{29}$ | 12.54 |
| $C_{30}$ | 1.72 |
| $C_{31}$ | 10.53 |
| $C_{32}$ | 1.29 |
| $C_{33}$ | 8.13 |
| $C_{34}$ | 0.89 |
| $C_{35}$ | 6.00 |
| $C_{36}+$ | 11.95 |
| | 99.88 |

EXAMPLE II

A predominantly alpha-methyl branched high molecular weight monocarboxylic acid was prepared by charging a glass reactor with 200 grams of an alpha-olefin mixture containing greater than 85 wt. % $C_{22-28}$ olefins (Gulf $C_{22+}$ alpha-olefin fraction, m.p. 127° F), 326 grams propionic acid and 8 grams di-t-butyl peroxide. The system was flushed with nitrogen and a slight nitrogen flow maintained while the reaction mixture was heated at reflux for about 4 hours. At the completion of the reaction unreacted propionic acid was removed under vacuum at 200° C. 225 Grams of the $C_{25+}$ alpha-methyl monocarboxylic acid having an acid value of 48 was recovered.

EXAMPLE III

A reactor was charged with a mixture of 300 grams of the $C_{22+}$ olefin of Example II and 200 grams pelargonic acid (Emfac 1202 pelargonic acid). A stream of oxygen containing 3% ozone was continuously bubbled in below the surface of the liquid at a rate of 24 SCFH at 4 psig so that approximately 35 grams ozone was being charged per hour. The temperature of the absorber was maintained above the titering point of the reaction mixture with vigorous agitation to insure intimate contact with the ozone and the progress of the reaction followed by analyzing the off-gases. Ozonolysis was terminated when ozone absorption dropped below 15%. The ozonides were oxidatively cleaved by the dropwise addition of the ozonide mixture into a vessel containing 100 grams pelargonic acid and 0.75 grams sodium hydroxide over a period of about 90 minutes. The reaction mixture was vigorously agitated and maintained at about 95° C while bubbling in a stream of oxygen containing 1% ozone at a rate of 2.4 SCFH. When the addition was complete, stirring was continued for an additional 90 minutes while bubbling in the $O_3/O_2$ mixture. The ozone generator was then turned off. Manganese acetate tetrahydrate (1.5 gms) was added and the temperature of the reaction mixture raised to 120° C while bubbling in pure oxygen with stirring. After 3½ hours the oxidation reaction was complete and the mixed oxidation was stripped of pelargonic acid by heating to 245° C while pulling a vacuum of 25 torr on the system. The mixed acid product contained approximately 80 wt. % $C_{21+}$ monocarboxylic acids.

EXAMPLE IV

234 Grams of an α-methyl branched monocarboxylic acid (acid value 60) obtained by the addition of propionic acid to a $C_{30+}$ α-olefin (approximately 75 wt. % $C_{30}$ and higher olefins) was charged to a glass esterification vessel with 100 mls decanol. The reaction mixture was heated to 270° C under nitrogen for several hours until 4 mls of water was removed. Excess decanol was then stripped from the reaction mixture. The resulting ester product had an acid value (AV) of 4.1, hydroxyl value of 35 and melted in the range 67°–75° C.

EXAMPLE V

Employing a similar procedure, 8 grams ethylene glycol (0.125 mole), 234 grams of the α-methyl monocarboxylic acid of Example IV (0.25 mole) and 1.2 grams $NaH_2PO_2$ catalyst were charged and reacted at 245° C for about 3 hours. The ester product, obtained after filtering with diatomaceous earth, had an AV of 18.4, hydroxyl value of 11.2 and melt point of 69°–72° C.

EXAMPLE VI

Using conventional esterification procedures, 100 grams of a mixed $C_{10-12}$ linear alcohols (average molecular weight 163) and 351 grams of the α-methyl monocarboxylic acid of Example IV were reacted. $NaH_2PO_2$ was employed as the catalyst. The reaction was conducted at 235° C under nitrogen for 4 hours during which time 5.5 mls of water was removed. The reaction mixture was then stripped at 220° C under reduced pressure (3 mm Hg) to remove the excess alcohol and filtered through Dicalite. The resulting ester product had an acid value of 5.3, a hydroxyl value of 15.7 and melted at 65°–66° C.

EXAMPLE VII

In a similar manner ethylene glycol was esterified with a mixed acid obtained by ozonolysis of a $C_{30+}$ α-olefin as described in Example I. 200 Grams of the mixed acid (acid value 82; neutral equivalent 685) and 9 grams ethylene glycol were reacted at 245° C under a nitrogen atmosphere employing 0.5 grams NaH$_2$PO$_2$ catalyst. After approximately 5 mls of water was removed, the reaction mixture was stripped and bleached with Filtrol for about ½ hour at 90° C under nitrogen. The final ester product had an acid value of 12.5, hydroxyl value of 39 and melted at 75°–77° C.

EXAMPLE VIII

Employing 115 grams of the mixed acid of Example VII and 90 grams of a C$_{20+}$ alcohols with 0.5 wt. % catalyst, an ester having an acid value of 5.1, hydroxyl value of 28 and melting in the range 42°–50° C was obtained.

EXAMPLE IX

115 Grams of a C$_{29+}$ monocarboxylic acid mixture (AV 97.5) obtained by the ozonolysis of a C$_{30+}$ olefin mixture was reacted with 6 grams glycerine using 1 gram NaH$_2$PO$_2$ catalyst. The ester product, obtained after filtration with Dicalite, melted at 68°–71° C, had an acid value of 1.3 and hydroxyl value of 53.

EXAMPLE X

To demonstrate the ability of the ester products of Example IV–IX to function as lubricants for PVC the esters were incorporated in the following standard pipe formulation:

| | |
|---|---|
| PVC resin (Geon 101-EP) | 100 parts |
| Tin mercaptide stabilizer | 2 parts |
| Acrylic processing aid | 4 parts |
| Titanium dioxide | 3 parts |
| Ester lubricant | 0.5–1 part |

The ingredients were blended in Henschel high speed mixer and the resin evaluated in a Brabender plasticorder — a convenient laboratory evaluation tool which measures the flow properties of the resin against time. Fusion times were determined on a 51 gram sample using a No. 6 roller head at 30 rpm and 195° C. Test results were as follows:

| Ester of Example: | Lubricant Level (phr) | Fusion Time (minutes) |
|---|---|---|
| IV | 0.5 | >60 |
| V | 0.5 | 64.5 |
| VI | 1 | >50 |
| VII | 1 | 50 |
| VIII | 1 | >60 |
| IX | 1 | 60 |
| Control (no lubricant) | 0 | ~1 |

It is evident from the above data that the esters of this invention are effective lubricants for PVC and appreciably extend the fusion time of the formulated resin.

EXAMPLE XI

The glycerine and tripentaerythritol esters of mixed C$_{29+}$ monocarboxylic acids obtained by the ozonization of an α-olefin mixture containing 75% by weight or more olefins having 30 or more carbon atoms were prepared and are hereinafter referred to as esters XIA and XIB, respectively. The esterification reaction was carried out in the usual manner employing 0.3 wt. % H$_3$PO$_2$ and 0.3 wt. % butyl titanate catalysts. The esters had the following properties:

| Ester Product | Acid Value | Hydroxyl Value | Melt Point (° C) |
|---|---|---|---|
| XIA | 14.1 | 20.2 | 59–64 |
| XIB | 19.3 | 37 | 71–75 |

These two esters were blended with polyvinylchloride resin (Diamond Shamrock PVC-40; inherent viscosity 0.83) at a 0.5 phr level in accordance with the following recipe:

| | |
|---|---|
| PVC resin | 100 parts |
| Tin mercaptide stabilizer | 2 parts |
| Epoxidized soya | 1 part |

Pressed 10 mil sheets of these resins exhibited excellent clarity. 56 Gram samples of each of the formulated resins were evaluated employing fusion conditions with the Brabender plasticorder at a temperature of 160° C using a No. 6 roller head and rotor speed of 60 rpm. Fusion data obtained for the resins lubricated with esters XIA and XIB and an unlubricated control resin were as follows:

| Ester Lube | T$_s$ (Time to start of fusion) | Torque (meter grams) | T$_p$ (Time to fusion peak) | Torque (meter grams) |
|---|---|---|---|---|
| XIA | 9'30'' | 850 | 16'15'' | 3250 |
| XIB | >60' | 350 | >60' | 350 |
| Control | 2'18'' | 1640 | 5'45'' | 4150 |

The extended fusion time of the formulated resins showed the esters of this invention to be highly efficient lubricants for PVC. The data also indicates that a significant reduction in the use level of the ester lubricant is possible in the compounding of the resin.

The resin formulations were also evaluated for dynamic thermal stability in the Brabender at a temperature of 195° C (other test conditions remained unchanged) with the following results:

| Ester Lube | T$_i$ (Time of initial torque rise) | Torque | T$_{td}$ (Time to thermal degradation peak) | Torque |
|---|---|---|---|---|
| XIA | 15'00'' | 1850 | 18'00'' | 2750 |
| XIB | 17'15'' | 1850 | 21'30'' | 2750 |
| Unlubricated Control | 9'00'' | 2150 | 12'24'' | 3400 |

It is apparent from this data that the stability of the formulated resin is enhanced by the addition of the ester products of this invention.

EXAMPLE XII

Esters XIA and XIB were employed in the following PVC formulation:

| | | |
|---|---|---|
| PVC (Diamond Shamrock PVC-40) | 100 | parts |
| Acrylic Processing Aid | 4 | parts |
| Tin mercaptide stabilizer | 2 | parts |
| Epoxidized soya | 1 | part |
| Lubricant ester | 0.5 | part |

The formulated resins were extruded employing the Brabender machine fitted with an extrusion head model EX-200. The extrusion was carried out at a screw speed of 40 rpm (¾ inch diameter — 20:1 L/D — 4:1 compression ratio screw; ¼ inch diameter rod die). The temperature of the first zone was 350° F. The second zone was heated to 365° F and die temperature was 380° F. Extrusion results were as follows:

| Ester Lube | Rate (lbs/hr) | Torque | Die pressure (psig) |
|---|---|---|---|
| XIA | 4.8 | 2300 | 1250 |
| XIB | 5.1 | 1500 | 900 |
| Unlubricated Control | 3.1 | 4800 | 2800 |

EXAMPLE XIII

The tripentaerythritol ester (XIB) was blended into a vinyl chloride/vinyl acetate (97/3) copolymer at a 0.5 phr level with 2 phr tin mercaptide stabilizer and 2 phr epoxidized soya. The dynamic thermal stability of this resin was measured with the Barbender plasticorder as described in Example XI. $T_i$ was 17'15" at a torque of 1900 meter grams. $T_{tg}$ was 33'00" at a torque of 2750 meter grams.

EXAMPLE XIV

An ester was prepared employing conventional procedures and a $H_3PO_2$/butyl titanate catalyst system by reacting 1 mole pentaerythritol and 4 moles crude mixed acids containing greater than 70 wt. % $C_{21-35}$ acids wherein the ratio of odd to even carbon content acids in the $C_{21-35}$ range was about 3:1 obtained from the ozonization of a $C_{30+}$ α-olefin. The esterification was carried out at 215°–228° C. The ester product, obtained after filtration with 1% Dicalite, had an acid value of 16.7, hydroxyl value of 17.9 and melted at 60°–65° C. This ester was blended in the folloing rigid PVC bottle formulation:

| | | |
|---|---|---|
| PVC resin (Ethyl SM-200) | 100 | parts |
| Tin stabilizer | 2 | parts |
| Acrylic processing aid | 3 | parts |
| Impact modifier | 12 | parts |
| Lubricant ester | 1 | part |

When the resin formulation was evaluated in the Brabender machine (177° C at 50 rpm) to determine its fusion properties, it was observed that the fusion time was more than double that of the resin formulation containing all the compounding ingredients except the lubricant ester.

EXAMPLE XV

A triglycerol ester (XVA) and tetraglycerol ester (XVB) were prepared employing stoichiometric amounts of predominantly $C_{21-35}$ aliphatic monocarboxylic acids and the polyols. The triglycerol ester had an acid value of 17.8, hydroxyl value of 35 and melted at 70°–75° C. The tetraglycerol ester had an acid value of 26.6, hydroxyl value of 29.5 and melted in the range of 75°–80° C. Both these esters were employed at 0.5 phr level in the formulation of Example XII and the fusion properties determined with the following results:

| Ester Lubricant | $T_s$ | Torque | $T_p$ | Torque |
|---|---|---|---|---|
| XVA | 7'30" | 750 | 11'45" | 2950 |
| XVB | 15'15" | 750 | 20'12" | 3000 |
| Unlubricated Control | 1'24" | 1900 | 3'30" | 4100 |

EXAMPLE XVI

788 Parts of the α-methyl branched acid of Example II and 25 parts ethylene glycol were charged to an esterification reactor with 0.3 wt. % $H_3PO_2$ and 0.3 wt. % butyl titanate catalyst. The reaction mixture was heated to about 235° C for about 3 hours during which time the acid value decreased to 28.0. Additional catalyst was then charged to the reactor with about 5 parts ethylene glycol and the reaction continued at 235° C for 4 hours. The final ester product (acid value of 23.6 and melt point 63°–65° C) was evaluated for dynamic thermal stability in PVC copolymer (97 wt % vinyl chloride/3 wt. % vinyl acetate) at 0.5 phr level. The formulation also included 2 phr tin stabilizer and 2 phr epoxidized soya. The formulated resin had a $T_i$ of 17'1-5" at 1900 meter grams torque and $T_{tg}$ of 33'00" and 2750 meter grams torque as compared to an unlubricated control which had a $T_i$ or 11'30" at 2100 meter grams torque and $T_{tg}$ of 17'24" at 3450 meter grams torque.

EXAMPLE XVII

In an effort to make a direct comparison of the tripentaerythritol ester of Example XI and a tripentaerythritol ester obtained using montan wax acids, the following experiment was conducted. Stoichiometric amounts of tripentaerythritol and montan wax acids (1 mole polyol:8 moles mixed acids) were charged to an esterification reactor with a conventional catalyst system. The montan wax acids were a commercially available material (Hoechst LP) which has an acid value in the range 115–130 and a drop point (modified ASTM D 556-49) in the range 78°–83° C. Analysis of the montan wax acids using the procedure described in Example I indicated that approximately 94% by weight of the acids were $C_{21-35}$ acids and about 3.5% by weight acids contained less than 21 carbon atoms. The ratio of odd to even carbon content in the $C_{21-35}$ range was 0.42:1. The esterification was conducted in the usual manner at 225°–230° C and the reaction followed by reduction in acid value. After 4 hours the acid value was only 45. When an effort was made to further reduce the acid value by additional heating the reaction mixture gelled. In an effort to eliminate gellation the reaction was repeated using the same reactants and catalyst but about 20% excess of the montan wax acids were charged. An acid value of 43 was obtained in 2½ hours, however, the product gelled before the acid value could be reduced below 40.

EXAMPLE XVIII

An ester of ethylene glycol and mixed high molecular weight acids (designed as Ester A) obtained by the ozonolysis of a $C_{30+}$ α-olefin was prepared for direct comparison against a commercially available wax ester (Hoechst E) produced from ethylene glycol and montan wax acids. The commercial wax ester had an acid value of 15–20 and drop point (modified ASTM D 556-49) of 76–81 and is designated as Ester B. The high molecular weight mixed acids used in the preparation of the ester contained about 10% $C_{9-21}$ acids, about 12% acids having more than 35 carbon atoms and about 88% $C_{21-35}$ acids, with the ratio of odd to even carbon content acids in the $C_{21-35}$ range being about 2:1. Ester A had an acid value of 19, hydroxyl value of 26 and melted in the range 75°–82° C.

The two ester products were incorporated into a PVC homopolymer in accordance with the following recipe:

| | |
|---|---|
| PVC resin (Diamond Shamrock PVC-40) | 100 parts |
| Octyl tin stabilizer | 2 parts |
| Epoxidized soya | 1 part |
| Lubricant ester | 0.5 part |

The formulated resins were milled on a conventional two roll mill at 350° F and sheeted out. Sheets were then pressed to 10 mil thickness in a 6 × 8 × 0.010 inch mold at 360° F and 500 psig for 3 minutes and 200 psig for 5 minutes. Pressed sheets containing Esters A and B both exhibited excellent clarity. 1 × 1 inch Squares were then stamped from the sheets and arranged on a series of eight glass trays which were fitted in a rotating ferris-wheel type device in an electric oven maintained at 380° F. Samples were removed from the oven at 10 minute invervals, allowed to cool and observed for discoloration and other signs of polymer degradation. The testing was terminated when all the samples failed or after 80 minutes. The resin formulation containing Ester A exhibited the first color change after 40 minutes whereas the resin formulation containing Ester B showed first signs of discoloration after 30 minutes. The resin containing Ester B was completely degraded within 70 minutes while the resin lubricated with Ester A withstood the complete 80 minute cycle before degradation.

Fusion data and dynamic thermal stability data were also obtained for the formulated resins in accordance with the procedure of Example XII and are recorded below:

| FUSION DATA | | | | |
|---|---|---|---|---|
| Lubricant | $T_s$ | Torque | $T_p$ | Torque |
| Ester A | 9'30" | 950 | 14'45" | 2700 |
| Ester B | 7'15" | 1000 | 10'00" | 3450 |
| None | 2'18" | 1650 | 5'45" | 4150 |

| DYNAMIC THERMALSTABILITY DATA | | | | |
|---|---|---|---|---|
| Lubricant | $T_i$ | Torque | $T_{iv}$ | Torque |
| Ester A | 25'00" | 1600 | 31'00" | 2700 |
| Ester B | 14'30" | 1800 | 17'30" | 2750 |
| None | 9'00" | 2150 | 12'24 | 3400 |

The commercial wax ester (B) and the ethylene glycol ester prepared in accordance with this invention (A) were also evaluated for their ability to be extruded employing the formulation and procedure described in Example XII. The following extrusion data was obtained:

| Lubricant | Rate (lbs/hr) | Torque | Die Pressure (psig) |
|---|---|---|---|
| Ester A | 4.5 | 2400 | 1250 |
| Ester B | 4.7 | 3300 | 1250 |
| None | 3.1 | 4800 | 2800 |

It is evident from the above Examples and comparative data that superior ester products are obtained by utilizing the high molecular weight acids derived from $C_{22+}$ α-olefins. It is also clearly shown that these ester products are efficient lubricants for thermoplastic resins, particularly for PVC homopolymers and copolymers, and that the esters of this invention are more effective than similar ester compositions derived from high molecular weight acids obtained from natural sources, such as montan wax acids.

In addition to their ability to function to lubricants for thermoplastic resins the esters of this invention also have other applications. Typically, they find use in any application where known wax esters, either synthetic or natural, have been utilized. For example, the esters of this invention are useful flip and antiblock agents. They can also be utilized in a wide variety of polishes including shoe polish, floor polish and automotive polishes. To demonstrate this latter point, 4.5 parts of ester A of Example XI was melted at 110° C with 1.5 parts microcrystalline wax (Petrolite C-1035), 3 parts carnauba was (NC No. 3), 21 parts paraffin wax (m.p. 143° F) and a solution (50° C) of 70 parts turpentine and 3 parts black dye was added to the melt, blended, cooled with stirring to 42° C and poured into containers. The resulting wax composition was an excellent polish for shoes and gave a high lustre shine. The product also had good surface gloss and solvent retention.

We claim:
1. An ester derived from an aliphatic hydroxylic compound having 2 to 25 carbon atoms and 1 to 10 primary or secondary hydroxyl groups and a mixed straight-chain aliphatic monocarboxylic acid obtained by the ozonization of a $C_{22+}$α-olefin wherein at least 90% by weight of the olefins contain 22 or more carbon atoms, said mixed acid containing less than 30% by weight acids having fewer than 21 carbon atoms, less than 20% by weight acids having greater than 35 carbon atoms and 55% by weight or more $C_{21-35}$ acids with the weight ratio of odd to even carbon content acids in the $C_{21-35}$ range being between 1.5:1 and 10:1.

2. The ester of claim 1 wherein the mixed straight-chain aliphatic monocarboxylic acid is derived from an α-olefin wherein 70% by weight of the olefins contain 30 or more carbon atoms.

3. The ester of claim 1 wherein the aliphatic hydroxylic compound is an aliphatic polyol or ether polyol having from 2 to 12 carbon atoms and 2 to 8 primary or secondary hydroxyl groups.

4. The ester of claim 3 which is further characterized by having an acid value less than 30, a hydroxyl value less than 40 and a melt point between about 50° and 120° C.

5. The ester of claim 3 wherein the mixed straight-chain aliphatic monocarboxylic acid contains less than 20 weight percent acids having fewer than 21 carbon atoms, less than about 10 weight percent acids having more than 35 carbon atoms and greater than 70 weight percent $C_{21-35}$ acids with the ratio of odd to even carbon content acids in the $C_{21-35}$ range being between 1.75:1 and 4:1.

6. The ester of claim 5 wherein the aliphatic hydroxylic compound is selected from the group consisting of ethylene glycol, neopentyl glycol, pentaerythritol, dipentaerythritol, tripentaerythritol, glycerol, diglycerol, triglycerol or tetraglycerol.

* * * * *